(12) United States Patent
Arai

(10) Patent No.: US 11,701,766 B2
(45) Date of Patent: Jul. 18, 2023

(54) TOOL, AND CONTROL CIRCUIT AND CONTROL METHOD THEREFOR

(71) Applicant: NITTO KOHKI CO., LTD., Tokyo (JP)

(72) Inventor: Shota Arai, Tokyo (JP)

(73) Assignee: NITTO KOHKI CO., LTD., Tokyo (JP)

(*) Notice: Subject to any disclaimer, the term of this patent is extended or adjusted under 35 U.S.C. 154(b) by 360 days.

(21) Appl. No.: 16/904,070

(22) Filed: Jun. 17, 2020

(65) Prior Publication Data
US 2020/0316764 A1    Oct. 8, 2020

Related U.S. Application Data

(63) Continuation of application No. PCT/JP2018/043754, filed on Nov. 28, 2018.

(30) Foreign Application Priority Data

Dec. 18, 2017    (JP) ................. 2017-241929

(51) Int. Cl.
*B25F 5/00*    (2006.01)
*G05B 19/416*    (2006.01)
*B25B 23/147*    (2006.01)

(52) U.S. Cl.
CPC ............ *B25F 5/001* (2013.01); *G05B 19/416* (2013.01); *B25B 23/147* (2013.01); *G05B 2219/45203* (2013.01)

(58) Field of Classification Search
CPC ... B25F 5/001; B25F 5/02; B25F 5/00; G05B 19/416; G05B 2219/45203;
(Continued)

(56) References Cited

U.S. PATENT DOCUMENTS 6,529,795 B1 *    3/2003    Friedrich ........... G05B 19/4155
700/186
2013/0331956 A1    12/2013    Kasuya

FOREIGN PATENT DOCUMENTS

EP    1315055    5/2003
EP    2719500    4/2014
(Continued)

OTHER PUBLICATIONS

Office Action issued in corresponding Korean Application No. 10-2020-7017553, dated Oct. 29, 2021.
(Continued)

*Primary Examiner* — Thomas C Lee
*Assistant Examiner* — Michael Tang
(74) *Attorney, Agent, or Firm* — Burris Law, PLLC

(57) ABSTRACT

An electric motor-driven screwdriver includes a control circuit having a memory stored with setting data and a computing unit controlling the electric motor-driven screwdriver based on the setting data. The computing unit sets an execution order of work processes based on a pre-designated piece of order setting data, and sets, based on a next operation setting value, a next operation to be performed after completion of the final work process. The next operation setting value is selectable from among a setting value for stopping the operation of the electric motor-driven screwdriver, a setting value for repeating a series of work processes, and a setting value for shifting to a series of work processes in an execution order determined based on another piece of order setting data.

5 Claims, 4 Drawing Sheets

|  | 1 | 2 | 3 | 4 | 5 | 6 | 7 | 8 | Next operation |
|---|---|---|---|---|---|---|---|---|---|
| 1st execution order | 1st work process | 2nd work process | 3rd work process | 4th work process | — | — | — | — | Termination |
| 2nd execution order | 3rd work process | 30th work process | 7th work process | — | — | — | — | — | Loop |
| 3rd execution order | 1st work process | 22nd work process | 29th work process | 15th work process | 13th work process | 4th work process | 9th work process | 13th work process | Shift to 4th execution order |
| 4th execution order | 6th work process | 21st work process | 11th work process | — | — | — | — | — | Termination |
| . . . | . . . | . . . | . . . | . . . | . . . | . . . | . . . | . . . | . . . |
| 30th execution order | 30th work process | 2nd work process | 5th work process | 2nd work process | 5th work process | — | — | — | Shift to 3rd execution order |

(58) Field of Classification Search
CPC ...... G05B 19/0426; G05B 2219/23078; G05B 19/4187; G05B 19/05; G05B 19/42; B25B 23/147; Y02P 90/02
See application file for complete search history.

(56) References Cited

FOREIGN PATENT DOCUMENTS

| | | | |
|---|---|---|---|
| JP | S60235211 | | 11/1985 |
| JP | S60235211 A | * | 11/1985 |
| JP | H07308865 | | 11/1995 |
| JP | 2002333912 | | 11/2002 |
| JP | 2007241755 | | 9/2007 |
| JP | 2009110223 A | * | 5/2009 |
| WO | 1991001197 | | 2/1991 |
| WO | 2017170648 | | 10/2017 |

OTHER PUBLICATIONS

Supplementary European Search Report issued in corresponding EP Application 18893251.1, dated Aug. 25, 2021.
International Search Report for International Application PCT/JP2018/043754, dated Jan. 29, 2019.

* cited by examiner

Fig. 2

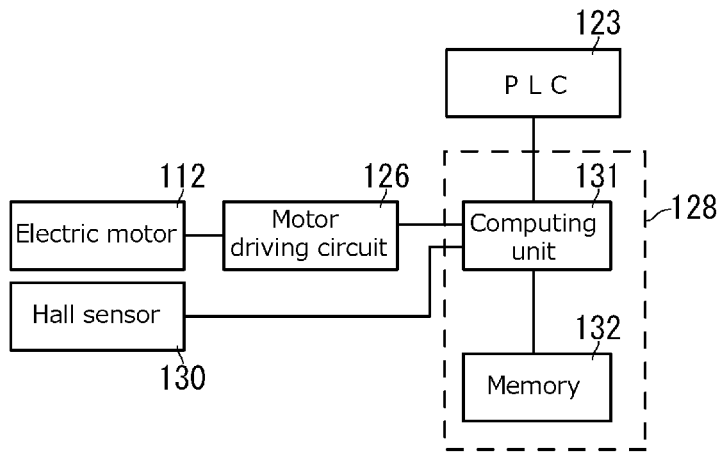

Fig. 3

|  | 1st work process | 2nd work process | 3rd work process | 4th work process | ... | 30th work process |
|---|---|---|---|---|---|---|
| Condition setting data | 1st condition setting data | 2nd condition setting data | 3rd condition setting data | 4th condition setting data | ... | 30th condition setting data |
| Tightening torque | 0.2 Nm | 0.5 Nm | 0.2 Nm | 0.5 Nm | ... | 0.4 Nm |
| Number of screws to be tightened | 4 | 4 | 8 | 8 | ... | 2 |
| . | . | . | . | . | ... | . |
| Minimum rotation time | 0.3 s | 0.1 s | 0.3 s | 0.1 s | ... | . |
| Maximum rotation time | — | 0.4 s | — | 0.4 s | ... | . |
| . | . | . | . | . | ... | . |
| Pass signal output | OFF | ON | OFF | ON | ... | ON |

Fig. 4

|  | 1 | 2 | 3 | 4 | 5 | 6 | 7 | 8 | Next operation |
|---|---|---|---|---|---|---|---|---|---|
| 1st execution order | 1st work process | 2nd work process | 3rd work process | 4th work process | — | — | — | — | Termination |
| 2nd execution order | 3rd work process | 30th work process | 7th work process | — | — | — | — | — | Loop |
| 3rd execution order | 1st work process | 22nd work process | 29th work process | 15th work process | 13th work process | 4th work process | 9th work process | 13th work process | Shift to 4th execution order |
| 4th execution order | 6th work process | 21st work process | 11th work process | — | — | — | — | — | Termination |
| . | . | . | . | . | . | . | . | . | . |
| 30th execution order | 30th work process | 2nd work process | 5th work process | 2nd work process | 5th work process | — | — | — | Shift to 3rd execution order |

TOOL, AND CONTROL CIRCUIT AND CONTROL METHOD THEREFOR

CROSS-REFERENCE TO RELATED APPLICATIONS

This application is a continuation of International Application No. PCT/JP2018/043754, filed on Nov. 28, 2018, which claims priority to and the benefit of Japanese Patent Application No. 2017-241929, filed on Dec. 18, 2017. The disclosures of the above applications are incorporated herein by reference.

FIELD

The present disclosure relates to a control circuit for a tool operating while sequentially changing control conditions for each work process, and also relates to a tool including such a control circuit, and to a control method for the tool.

BACKGROUND

Patent Literature 1, for example, discloses an electric motor-driven screwdriver performing screw tightening work by rotationally driving a screwdriver bit with an electric motor. Such an electric motor-driven screwdriver is usually configured to allow a user to change the setting of the rotational speed and tightening torque of the electric motor, for example, in accordance with the type of screws and a member to be fastened with screws. Meanwhile, at factory production lines, tightening operations for different types of screws may be continuously performed in a predetermined sequence. An electric motor-driven screwdriver used in such a case is configured such that, when a certain work process is completed and going to shift to the next work process, the settings of the electric motor-driven screwdriver are automatically changed to those for the control conditions required in the next work process.

In the above-described electric motor-driven screwdriver, data for setting an execution order of work processes in conformity to the contents of work to be done at the production line has previously been stored in a memory of the electric motor-driven screwdriver, and the electric motor-driven screwdriver sequentially makes a setting change according to the setting data. The maximum number of work processes that can be set depends on the capacity of the memory. With the above-described electric motor-driven screwdriver, for example, 8 work processes can be registered at maximum as a series of work processes.

CITATION LIST

Patent Literature

Patent Literature 1: WO 2017/170648

SUMMARY

Technical Problem

The number of work processes needed to be executed differs for each individual production line. In some cases, it may be necessary to execute a greater number of work processes than the maximum number of work processes registered. On such an occasion, the conventional practice is as follows. The user manually changes the settings to execute the next work processes, or alternatively, the electric motor-driven screwdriver is previously communicatively connected to an external device, e.g. a programmable logic controller (PLC), and an instruction is sent from the external device to the electric motor-driven screwdriver to make a setting change, thereby changing the settings of the electric motor-driven screwdriver.

It is, however, not efficient that the user manually makes a setting change every time at the production site. Meanwhile, in a case where a setting change is made by the external device, the setting itself is complicated. In addition, to change the execution order of work processes, it may be necessary to change not only the settings of the electric motor-driven screwdriver but also the settings of the external device. In such a case, the setting change becomes even more complicated.

Under the above-described circumstances, an object of the present invention is to provide a control circuit for a tool operating while sequentially changing control conditions for each work process, the control circuit being configured to enable setting of an operation to be performed after the completion of a series of work processes in a set execution order, thereby making it possible to continuously execute a series of work processes in another execution order, without depending on a user's manual operation or control by an external device. Another object of the present invention is to provide a tool including the above-described control circuit, and also to provide a control method for the tool.

Solution to Problem

The present invention provides a control circuit for use in a tool operating while sequentially changing control conditions for each work process. The control circuit includes an information storage unit storing setting data including condition setting data for setting control conditions in each work process, a plurality of pieces of order setting data for setting an execution order of work processes, and a next operation setting value for setting a next operation to be performed after completion of a series of work processes in an execution order determined based on each piece of order setting data. The control circuit further includes a computing unit controlling the tool based on the setting data. The computing unit is configured to set an execution order of work processes based on a predetermined one of the plurality of pieces of order setting data and to sequentially change control conditions of the tool for each work process based on the condition setting data. The computing unit is further configured to determine, based on the next operation setting value, a next operation to be performed after completion of a series of work processes in the execution order determined based on the predetermined piece of order setting data. The control circuit is configured to allow selection of, as the next operation setting value, a setting value for designating another piece of order setting data and shifting the operation of the tool to a series of work processes in an execution order determined based on the designated piece of order setting data.

The control circuit enables setting, by a next operation setting value, a next operation to be performed after completion of a series of work processes in an execution order of work processes determined based on a certain piece of order setting data. In addition, the control circuit enables shifting to a series of work processes in an execution order of work processes determined based on another piece of order setting data as a next operation, thereby allowing the operation of the electric motor-driven screwdriver to be further continued. In other words, it is possible to operate the electric motor-driven screwdriver in a sequence comprising a combination of work orders set as a plurality of pieces of order setting data, without depending on a user's manual operation or control by an external device. Consequently, even more complicated work processes can be performed automatically and continuously. It is also possible to reduce the burden of changing the settings of the external device which may be required due to the change of the work processes.

Preferably, the arrangement may be such that the control circuit is configured to allow selection of, as the next operation setting value, a setting value for terminating the operation of the tool, and a setting value for executing again the series of work processes in the execution order determined based on the predetermined piece of order setting data.

Preferably, the computing unit may be configured to be capable of storing in the information storage unit a history of work processes executed through the execution order determined based on the predetermined piece of order setting data and the execution order determined based on the designated piece of order setting data, and of returning a work process to be executed by the tool to any desired work process among the work processes in the history.

In addition, the present invention provides a tool including any of the above-described control circuits and configured to operate while sequentially changing control conditions for each work process based on control by the control circuit.

In addition, the present invention provides a control method for a tool operating while sequentially changing control conditions for each work process. The control method includes the steps of: reading setting data including condition setting data for setting control conditions in each work process, a plurality of pieces of order setting data for setting an execution order of work processes, and a next operation setting value for setting a next operation to be performed after completion of a series of work processes in the execution order determined based on each piece of order setting data; setting an execution order of work processes based on a predetermined one of the plurality of pieces of order setting data; sequentially changing control conditions of the tool for each work process based on the condition setting data; and determining, based on the next operation setting value, a next operation to be performed after completion of a series of work processes in the execution order determined based on the predetermined piece of order setting data, wherein the control circuit is configured to allow selection of, as the next operation setting value, a setting value for designating another piece of order setting data and shifting the operation of the tool to a series of work processes in an execution order determined based on the designated piece of order setting data.

Embodiments of the tool according to the present invention will be explained below on the basis of the accompanying drawings.

DRAWINGS

FIG. 2 is a functional block diagram of the electric motor-driven screwdriver shown in FIG. 1.

FIG. 3 is a diagram showing condition setting data stored in a memory.

FIG. 4 is a diagram showing order setting data stored in the memory.

DETAILED DESCRIPTION

Figure 1:
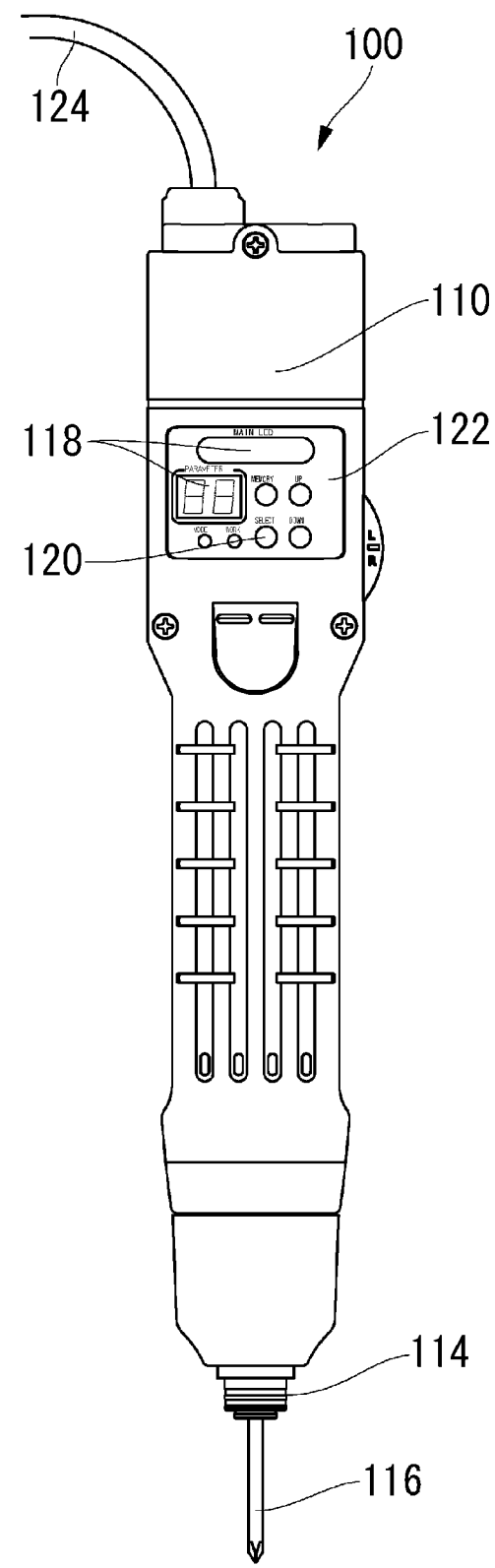
FIG. 1 is an external view of an electric motor-driven screwdriver according to a first embodiment of the present invention.

An electric motor-driven screwdriver (tool) 100 according to a first embodiment of the present invention includes, as shown in FIGS. 1 and 2, a tool housing 110, an electric motor 112 built in the tool housing 110, and a bit holder 114 driven to rotate by the electric motor 112. The bit holder 114 is detachably fitted with a screwdriver bit 116 appropriately selected in accordance with screws to be tightened. The tool housing 110 is provided with an input interface 122 having display sections 118 and input buttons 120, and further provided with a connector cable 124 for connecting the electric motor-driven screwdriver 100 to a programmable logic controller (hereinafter referred to as "PLC") 123. The tool housing 110 is further provided therein with a motor driving circuit 126 for controlling the drive of the electric motor 112, a control circuit 128 for controlling the whole electric motor-driven screwdriver 100, and a Hall sensor 130 for detecting the rotational position of the rotor of the electric motor 112. The control circuit 128 has a computing unit 131 and a memory (information storage unit) 132 having setting data stored therein. The computing unit 131 controls the electric motor-driven screwdriver 100 based on the setting data stored in the memory 132.

The setting data stored in the memory 132 includes condition setting data for setting control conditions in each work process. The memory 132 of the electric motor-driven screwdriver 100 is capable of storing, as shown in FIG. 3, 1st to 30th condition setting data respectively corresponding to 1st to 30th work processes. The condition setting data include setting values representing the tightening torque to be applied when tightening screws and those representing the numbers of screws to be tightened. In addition to these, the condition setting data may include setting values for controlling the rotational speed of the electric motor 112, for example. The condition setting data of the electric motor-driven screwdriver 100 further include an acceptance criterion value representing an acceptance criterion for the operation of the electric motor-driven screwdriver 100 in each work process. In the electric motor-driven screwdriver 100, acceptance criterion values include setting values for setting a minimum rotation time and maximum rotation time of the electric motor 112 when performing screw tightening work. For example, when the electric motor 112 stops after rotating for a shorter time than the minimum rotation time, it is assumed that the screw head was seated earlier than the expected time, whereas when the electric motor 112 stops after rotating for a longer time than the maximum rotation time, it is assumed that the screw head was seated later than the expected time. That is, when the electric motor 112 stops before the minimum rotation time or after the maximum rotation time, it is possible to judge that there is a high probability that screw tightening was performed using an erroneously selected screw. When judging that the operation of the electric motor-driven screwdriver 100 does not meet the acceptance criterion, the computing unit 131 temporarily stops the operation of the electric motor-driven screwdriver 100 and outputs a fail signal to the PLC 123. The condition setting data further include a pass signal output setting value for setting whether or not to output a pass signal to the outside when the acceptance criterion is met. The computing unit 131 is capable of outputting a pass signal when judging the operation performed in a certain work process meets the acceptance criterion. However, whether or not to output a pass signal is determined by the pass signal output setting value. That is, when the pass signal output setting value is a setting value (ON) at which a pass signal is to be output, the computing unit 131 outputs a pass signal to the PLC 123, whereas when the pass signal output setting value is a setting value (OFF) at which no pass signal is to be output, the computing unit 131 does not output a pass signal to the PLC 123. These setting values of the condition setting data have previously been set to appropriate values in accordance with the corresponding work processes, respectively. It should be noted that the above-described setting items in the condition setting data are shown for illustrative purposes only, and that other items may be employed in accordance with the supposed work processes.

The setting data further include a plurality of pieces of order setting data for setting an execution order of work processes. As shown in FIG. 4, the memory 132 of the electric motor-driven screwdriver 100 has pieces of order setting data previously stored therein. The pieces of order setting data show the execution orders and allow setting of 1st to 30th execution orders. Each piece of order setting data allows registration of 8 work processes at maximum. Each piece of order setting data further includes a next operation setting value for setting a next operation to be performed after the completion of a series of work processes. The electric motor-driven screwdriver 100 allows selection of, as a next operation setting value, a setting value (termination) for stopping the operation of the electric motor-driven screwdriver 100, a setting value (loop) for executing again a series of work processes in the same execution order, or a setting value (shift to another execution order) for shifting to a series of work processes in an execution order determined based on another piece of order setting data.

The above-described condition setting data and order setting data included in the setting data can be changed as desired by operating the input interface 122. It is also possible to rewrite the setting data by transmitting corresponding data from an external device, e.g. a personal computer.

Upon completion of predetermined initial setting after activation of the electric motor-driven screwdriver 100, the computing unit 131 reads necessary setting data from the memory 132. It is possible to select any desired one of a plurality of execution orders. Usually, an execution order has been designated in advance. The computing unit 131 reads a predetermined piece of order setting data corresponding to the designated execution order and sets the execution order of work processes. When the 1st execution order has previously been designated, for example, 1st order setting data is read. That is, as shown in FIG. 4, 1st work process, 2nd work process, 3rd work process, and 4th work process are set as a series of work processes, and these work processes are executed sequentially. The computing unit 131 operates the electric motor-driven screwdriver 100 while sequentially changing the control conditions for each work process based on the 1st to 4th condition setting data respectively corresponding to these work processes. In this embodiment, the 1st work process is assumed to perform temporary tightening of 4 screws, and the 2nd work process is assumed to perform final tightening of the temporarily tightened screws. Therefore, when the 1st work process is normally completed, 4 screws have been screwed in to such an extent that the heads of the screws have not yet been seated. In the 2nd work process, the temporarily tightened screws are further screwed in to seat the screw heads and further tightened with a predetermined tightening torque. This completes the tightening of 4 screws. The pass signal output setting value of the 1st condition setting data is "OFF". Therefore, the computing unit 131 does not output a pass signal even when the 1st work process is normally completed and thus the acceptance criterion is met. On the other hand, the pass signal output setting value of the 2nd condition setting data is "ON". Therefore, when the 2nd work process is normally completed and thus the acceptance criterion is met, the computing unit 131 outputs a pass signal. Similarly, in the 3rd work process, 8 screws are temporarily tightened, and in the 4th work process, the 8 temporarily tightened screws are finally tightened. Upon normal completion of the 4th work process, a pass signal is output. The next operation setting value of the 1st order setting data is "termination". Therefore, the operation of the electric motor-driven screwdriver 100 is stopped upon completion of the 4th work process.

As has been described above, no pass signal is output upon completion of the 1st and 3rd work processes, which are temporary tightening processes, and a pass signal is output only upon completion of the 2nd and 4th work processes, which are final tightening processes. With this configuration, the PLC 123 receives a pass signal only when screw tightening has been completed. The PLC 123 controls the operation of other peripheral device and so forth in association with the operation of the electric motor-driven screwdriver 100 but does not always perform some control action every time a work process is completed. In many cases, the PLC 123 is configured to perform control only upon completion of a predetermined work process. In the conventional electric motor-driven screwdriver 100, a pass signal is output every time a work process is completed; therefore, it has been necessary to make a setting on the PLC 123 side so as to ignore unnecessary pass signals. In contrast to this, the electric motor-driven screwdriver 100 of the present invention can be set not to output an unnecessary pass signal, and it is therefore possible to eliminate the need to make a setting on the PLC 123 side so as to ignore pass signals. In the case of newly adding a process for additionally tightening screws next to the above-described 2nd work process, for example, the first tightening of 4 screws is completed when all the 1st to 3rd work processes are completed. Therefore, the pass signal output setting value upon completion of the 2nd work process is set to "OFF", and the pass signal output setting value upon completion of the 3rd work process (additional tightening process), which is newly added, is set to "ON". Consequently, the change in the work processes causes no setting change on the PLC 123 side.

When the 2nd execution order has previously been designated, 2nd order setting data is read. That is, 3rd work process, 30th work process, and 7th work process are set as a series of work processes, and the electric motor-driven screwdriver 100 operates while sequentially changing the control conditions for each work process. The next operation setting value of the 2nd order setting data is "loop". Therefore, upon completion of the 7th work process, which is the final work process, the operation returns to the 3rd work process, which is the initial work process. Thereafter, the same work processes are repeatedly executed.

When the 3rd execution order has previously been designated, 3rd order setting data is read. That is, 8 work processes, i.e. 1st work process, which is the initial work process, to 13th work process, which is the final work process, are set as a series of work processes, and the electric motor-driven screwdriver 100 operates while sequentially changing the control conditions for each work process. The next operation setting value of the 3rd order setting data is "shift to 4th execution order". Therefore, upon completion of the 13th work process, which is the final work process, the designated 4th order setting data is read. That is, the 4th execution order is set, and the operation shifts to a series of work processes in the 4th execution order. The electric motor-driven screwdriver 100 continues to operate based on the series of work processes in the 4th execution order. Upon completion of the 11th work process, which is the final work process in the 4th execution order, the operation of the electric motor-driven screwdriver 100 stops because the next operation setting value of the 4th order setting data is "termination".

Thus, the electric motor-driven screwdriver 100 is configured so that a next operation to be performed after the completion of a series of work processes determined based on certain order setting data can be selected from among "termination", "loop", and "shift to another execution order". In particular, the electric motor-driven screwdriver 100 is capable of shifting to an execution order determined based on another piece of order setting data. Therefore, work processes to be executed in a more complicated execution order can be set by the electric motor-driven screwdriver 100 itself without depending on the control of an external device, e.g. the PLC 123. Further, if frequently used basic execution orders have previously been set as respective pieces of order setting data and if a setting is made so that the operation is properly shifted among the execution orders, a process change can be made more rapidly and easily than in a case where execution orders are rearranged from the beginning. It should be noted that the group of selectable next operations need not always include the above-described three but may include other next operations in place of or in addition to the three.

The electric motor-driven screwdriver 100 is further configured to store in the memory 132 a history of work processes executed through a plurality of execution orders based on a plurality of pieces of order setting data. There may be a case where due to a mistake in a work process, the work process needs to be done over again, or the operation needs to be done over again from a work process previous to the relevant work process, depending on the situation. In such a case, the operation can return to a work process that needs to be done over again based on the history of work processes stored in the memory 132. More specifically, the operation can return to the previous work process recorded in the history by actuating the input buttons 120 of the input interface 122. The arrangement is such that the operation can return to any of the following points in the work processes by actuating the input buttons 120: the operation returns by one work step in the relevant work process; the operation returns to the immediately preceding work process; the operation returns to the final work process in the execution order determined based on the immediately preceding piece of order setting data; or the operation returns to the initial work process in the execution order determined based on the immediately preceding piece of order setting data. It should be noted that the memory 132 of the electric motor-driven screwdriver 100 comprises a combination of a readable and writable nonvolatile memory and a volatile memory for temporarily storing data required for program operations, e.g. a cache memory, and that the setting data are stored in the nonvolatile memory, and the history of work processes is stored in the volatile memory.

Figure 5:
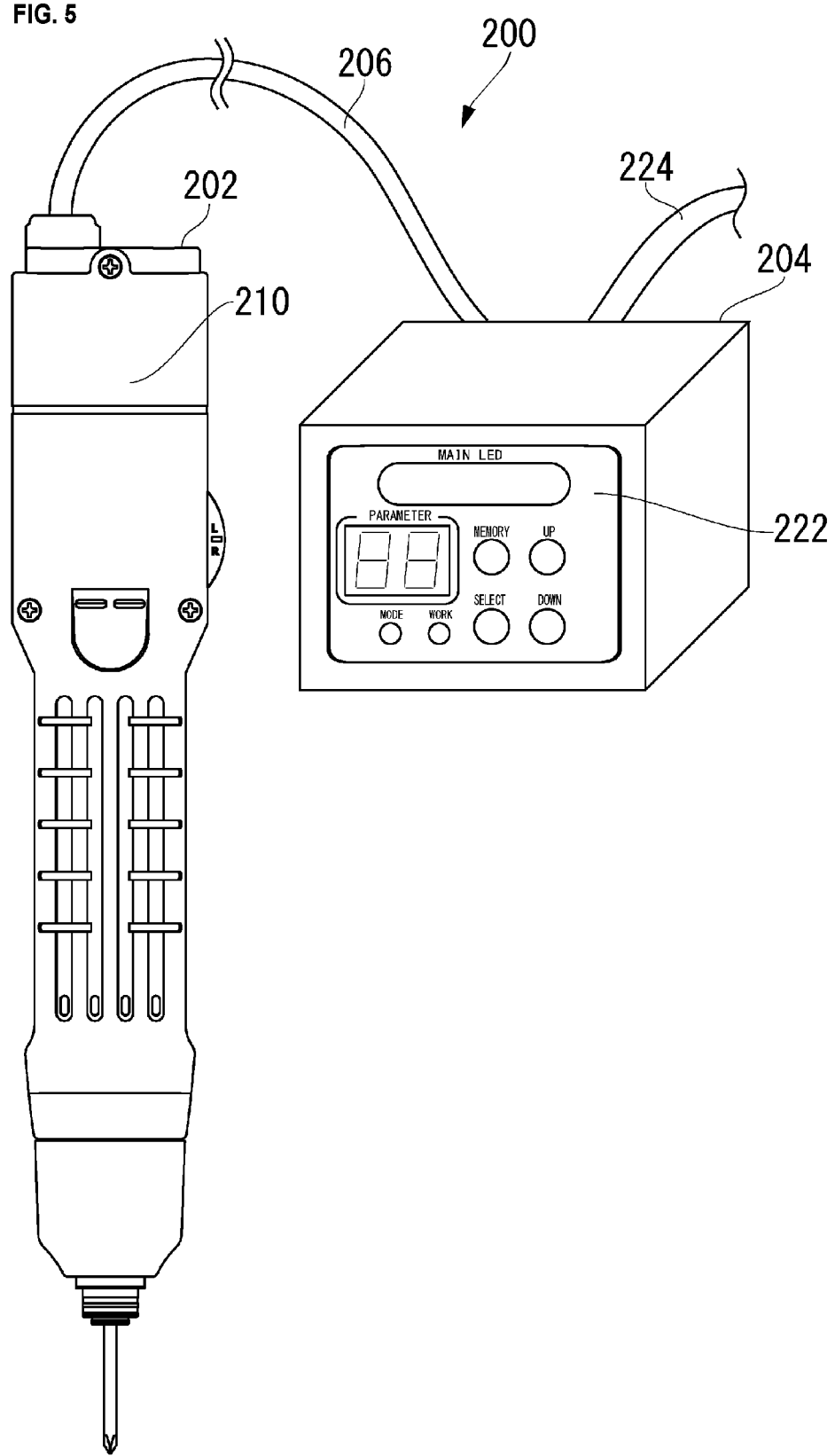
FIG. 5 is an external view of an electric motor-driven screwdriver according to a second embodiment of the present invention.
Figure 6:
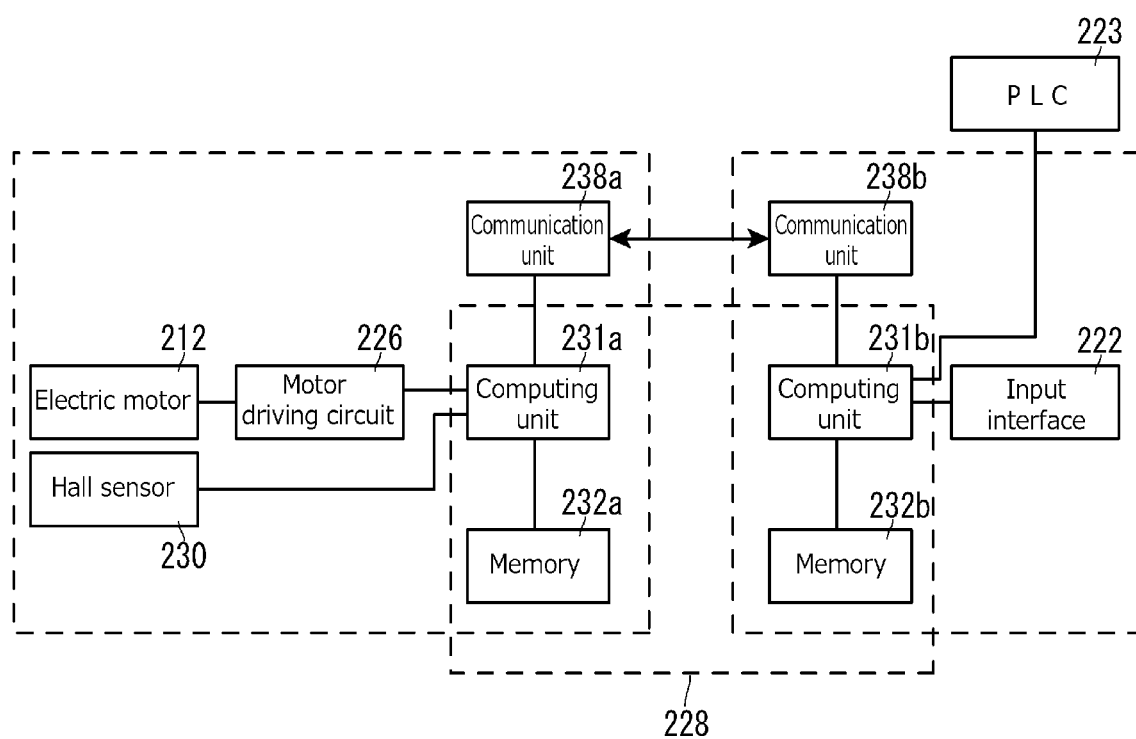
FIG. 6 is a functional block diagram of the electric motor-driven screwdriver shown in FIG. 5.

An electric motor-driven screwdriver 200 according to a second embodiment of the present invention comprises, as shown in FIGS. 5 and 6, an electric motor-driven screwdriver body 202 and a controller 204 for controlling the screwdriver body 202. The electric motor-driven screwdriver body 202 and the controller 204 are connected to each other by a communication cable 206 through communication units 238a and 238b which are provided in the electric motor-driven screwdriver body 202 and the controller 204, respectively. A communication cable 224 connected to a PLC 223 is provided on the controller 204 side. The electric motor-driven screwdriver body 202 has a tool housing 210 provided therein with an electric motor 212, a motor driving circuit 226, and a Hall sensor 230, which are similar to those of the electric motor-driven screwdriver 100 according to the first embodiment. An input interface 222 is provided on the controller 204 side.

The electric motor-driven screwdriver 200 has computing units 231a and 231b provided in the electric motor-driven screwdriver body 202 and the controller 204, respectively. The two computing units 231a and 231b communicate with each other through the communication cable 206. The two computing units 231a and 231b perform a function similar to that of the computing unit 131 in the first embodiment. Similarly, memories 232a and 232b are provided in the electric motor-driven screwdriver body 202 and the controller 204, respectively. The two memories 232a and 232b perform a function similar to that of the memory 132 in the first embodiment. That is, the electric motor-driven screwdriver has a control circuit 228 dispersedly disposed in the electric motor-driven screwdriver body 202 and the controller 204.

It should be noted that, although in this embodiment the computing units 231a and 231b and the memories 232a and 232b are dispersedly disposed in the electric motor-driven screwdriver body 202 and the controller 204, the above-described components may be disposed together in either the electric motor-driven screwdriver body 202 or the controller 204. Alternatively, the whole control circuit 228 may be disposed on the controller 204 side.

Although some embodiments of the present invention have been described above, the present invention is not limited to the described embodiments. For example, in the above-described embodiments, the tool of the present invention has been explained as an electric motor-driven screwdriver, which is one type of electric motor-driven tools, for example. The present invention may, however, be applied to other electric motor-driven tools such as a torque wrench and a polishing machine, and may also be applied to other power tools having a control circuit configured as described above and using an air motor as a power source in place of an electric motor. Further, the tool of the present invention may be a hand tool having no power. Examples of such a hand tool include a torque wrench having a torque detecting function. The torque wrench includes a control circuit having a memory stored with setting data including condition setting data for each work process, the condition setting data including the number of times of tightening nuts, bolts, or the like (control conditions) and a torque reference value (acceptance criterion) in tightening operation. When the tightening operation has been performed by a predetermined number of times, which has been set for the relevant work process, the operation is shifted to the next work process by the computing unit of the control circuit, and the control conditions are changed based on the setting data. Further, the control circuit compares a torque value detected by a torque sensor during a tightening operation with the torque reference value to judge if the tightening operation is acceptable. The condition setting data include a pass signal output setting value in the same way as in the above-described embodiments. That is, whether or not to output a pass signal when the tightening operation satisfies the torque reference value (acceptance criterion) can be set as desired for each work process. Similarly, a next operation to be performed upon completion of a series of work processes set by order setting data can be selected based on the order setting data and a next operation setting value.

Further, the tool of the present invention can be configured to be connectable to an external device other than the PLC, e.g. a personal computer, and can also be configured to transmit a pass signal and a fail signal wirelessly. Further, the information storage unit for storing the setting data is not limited to the above-described built-in semiconductor memory. It is also possible to use other devices such as a hard disk drive, recording media, e.g. writable CD and DVD, and a removable USB memory, and also possible to combine these devices as desired to constitute the information storage unit.

LIST OF REFERENCE SIGNS

100: electric motor-driven screwdriver (tool); 110: tool housing; 112: electric motor; 114: bit holder; 116: screwdriver bit; 118: display sections; 120: input buttons; 122: input interface; 123: programmable logic controller (PLC); 124: connector cable; 126: motor driving circuit; 128: control circuit; 130: Hall sensor; 131: computing unit; 132: memory (information storage unit); 200: electric motor-driven screwdriver; 202: electric motor-driven screwdriver body; 204: controller; 206: communication cable; 210: tool housing; 212: electric motor; 222: input interface; 224: communication cable; 226: motor driving circuit; 228: control circuit; 230: Hall sensor; 231*a*: computing unit; 231*b*: computing unit; 232*a*: memory; 232*b*: memory; 238*a*: communication unit; 238*b*: communication unit.

What is claimed is:

1. A control circuit for use in a tool operating while sequentially changing control conditions for each work process, the control circuit comprising:
    an information storage unit storing setting data including condition setting data for setting control conditions in each work process, and a plurality of pieces of order setting data for setting an execution order of work processes, each piece of order setting data including a next operation setting value for setting a next operation to be performed after completion of a series of work processes in an execution order determined based on the order setting data; and
    a computing unit controlling a tool based on the setting data, the computing unit being configured to set an execution order of work processes based on a predetermined piece of order setting data from among the plurality of pieces of order setting data and to sequentially change control conditions of the tool for each work process based on the condition setting data, the computing unit being further configured to determine, based on the next operation setting value of the predetermined piece of order setting data, a next operation to be performed after completion of a series of work processes in the execution order determined based on the predetermined piece of order setting data;
    wherein the control circuit is configured to allow selection of, as the next operation setting value, a setting value for designating another piece of order setting data and shifting an operation of the tool to a series of work processes in an execution order determined based on the designated piece of order setting data.

2. The control circuit of claim 1, wherein the control circuit is further configured to allow selection of, as the next operation setting value, a setting value for terminating the operation of the tool, and a setting value for executing again the series of work processes in the execution order determined based on the predetermined piece of order setting data.

3. The control circuit of claim 1, wherein the computing unit is configured to be capable of storing in the information storage unit a history of work processes executed through the execution order determined based on the predetermined piece of order setting data and the execution order determined based on the designated piece of order setting data, and of returning a work process to be executed by the tool to any desired work process among the work processes in the history.

4. A tool comprising the control circuit of claim 1, the tool being configured to operate while sequentially changing control conditions for each work process based on control by the control circuit.

5. A control method for a tool operating while sequentially changing control conditions for each work process, the control method comprising the steps of:
    reading setting data including condition setting data for setting control conditions in each work process, and a plurality of pieces of order setting data for setting an execution order of work processes, each piece of order setting data including a next operation setting value for setting a next operation to be performed after completion of a series of work processes in an execution order determined based on the order setting data;
    setting an execution order of work processes based on a predetermined piece of order setting data from among one of the plurality of pieces of order setting data;
    sequentially changing control conditions of the tool for each work process based on the condition setting data; and
    determining, based on the next operation setting value of the predetermined piece of order setting data, a next operation to be performed after completion of a series of work processes in the execution order determined based on the predetermined piece of order setting data, wherein the next operation setting value is selected as a setting value for designating another piece of order setting data and shifting an operation of the tool to a series of work processes in an execution order determined based on the designated piece of order setting data.

\* \* \* \* \*